(12) United States Patent
Danley

(10) Patent No.: US 9,933,249 B2
(45) Date of Patent: Apr. 3, 2018

(54) DYNAMIC MECHANICAL ANALYZER AND SAMPLE FIXTURES FOR A DYNAMIC MECHANICAL ANALYZER

(71) Applicant: Waters Technologies Corporation, Milford, MA (US)

(72) Inventor: Robert L. Danley, Collingswood, NJ (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 0 days.

(21) Appl. No.: 15/104,022

(22) PCT Filed: Dec. 4, 2014

(86) PCT No.: PCT/US2014/068493
§ 371 (c)(1),
(2) Date: Jun. 13, 2016

(87) PCT Pub. No.: WO2015/094676
PCT Pub. Date: Jun. 25, 2015

(65) Prior Publication Data
US 2016/0349041 A1   Dec. 1, 2016

Related U.S. Application Data

(60) Provisional application No. 61/916,434, filed on Dec. 16, 2013.

(51) Int. Cl.
*G01B 11/16* (2006.01)
*G01L 1/22* (2006.01)
*G01L 3/10* (2006.01)

(52) U.S. Cl.
CPC ............ *G01B 11/16* (2013.01); *G01L 1/2206* (2013.01); *G01L 3/101* (2013.01)

(58) Field of Classification Search
CPC ....... G01B 11/16; G01L 1/2206; G01L 3/101; G01N 3/00; G01N 3/06; F27B 17/02
(Continued)

(56) References Cited

U.S. PATENT DOCUMENTS 4,034,602 A * 7/1977 Woo .................. G01N 3/32
                                                374/47
4,730,498 A    3/1988 Blanch
(Continued)

FOREIGN PATENT DOCUMENTS

WO    2015094676 A2    6/2015

OTHER PUBLICATIONS

PCT Notification of Transmittal of the International Search Report and the Written Opinion of the International Searching Authority; International Search Report; and Written Opinion, dated Mar. 11, 2015 in International Application No. PCT/US2014/068493.
(Continued)

*Primary Examiner* — Harshad R Patel
*Assistant Examiner* — Octavia Hollington
(74) *Attorney, Agent, or Firm* — Schmeiser, Olsen & Watts LLP

(57) ABSTRACT

A dynamic mechanical analyzer and a sample fixture for a dynamic mechanical analyzer that attaches fixed clamps in the sample fixture to a rigid frame using mounts that are compliant in the direction perpendicular to the sample displacement but which at the same time are resistant to rotation about the transverse direction of the sample. The compliant mounts include a pair of flexures that are attached to each fixed clamp and to the frame of the sample fixture. In an embodiment, the pair of flexures are thin flat members such that each pair constitutes two parallel leaf springs. The flexures flex to allow the fixed clamps to move perpendicu-
(Continued)

larly to the sample displacement, but at the same time prevent rotation of the fixed clamps.

22 Claims, 4 Drawing Sheets

(58) Field of Classification Search
USPC .............................. 73/800, 856; 250/237 G
See application file for complete search history.

(56) References Cited

U.S. PATENT DOCUMENTS

| | | |
|---|---|---|
| 4,967,601 A | 11/1990 | Teramoto |
| 5,510,581 A | 4/1996 | Angel |
| 5,710,426 A | 1/1998 | Reed et al. |
| 7,471,032 B1 | 12/2008 | Orcutt et al. |
| 7,770,467 B1 * | 8/2010 | Halderman .............. G01N 3/04 73/849 |
| 2016/0018306 A1 * | 1/2016 | Woo ........................ G01N 3/20 73/788 |

OTHER PUBLICATIONS

Micro Surface Engr. Inc., Flexures, Aug. 29, 2012, [online] [retrieved on Feb. 17, 2014]. Retrieved from the internet: <URL: http://www.precisionballs.com/Flexures.php#catalog>;Simple Reed Flexures.

* cited by examiner

DYNAMIC MECHANICAL ANALYZER AND SAMPLE FIXTURES FOR A DYNAMIC MECHANICAL ANALYZER

CROSS REFERENCE TO RELATED APPLICATIONS

This application is a U.S. National Stage of International Application No. PCT/US2014/068493, filed Dec. 4, 2014, which claims priority to and the benefit of U.S. Provisional Application No. 61/916,434, filed Dec. 16, 2013, the contents and teachings of all of which are hereby expressly incorporated by reference in their entireties.

BACKGROUND

The embodiments disclosed herein relate to dynamic mechanical analyzers (DMAs) and to sample fixtures for use in DMAs. Dynamic mechanical analysis is a material characterization method which exposes a sample to a periodic force and measures the resulting displacement. A dynamic mechanical analyzer measures the phase between the applied force and the resulting displacement of the sample, and uses this measurement to separate the force into a viscous and an elastic component. The elastic component is the displacement energy that is stored in the sample while the viscous component is the displacement energy that is lost via viscous dissipation.

In many DMAs, the instrument typically displays the elastic and viscous components as the storage modulus and the loss modulus. Experiments are generally performed over a range of temperatures or over a range of frequencies to measure temperature-dependent or frequency-dependent material characteristics, respectively. The glass transition is an important temperature and frequency dependent material characteristic that is often measured using dynamic mechanical analysis. In this transition, an amorphous or glassy material becomes more flexible or rubbery, typically as temperature increases. DMAs typically detect the glass transition as a sharp decrease in the storage modulus and an attendant increase in the loss modulus.

DMAs may subject samples to different deformation modes, including tension, compression, shear and flexure. The tension mode is typically employed for analysis of samples with very small cross sectional areas such as thin films or fibers. The compression mode is most often used for analysis of very soft materials such as foams. FIGS. 8 and 11 of U.S. Pat. No. 5,710,426, which is incorporated by reference herein, show examples of tension and compression fixtures. Samples may be deformed in shear using torsion fixtures or parallel plate shearing fixtures. FIG. 12 of U.S. Pat. No. 5,710,426 shows an example of a parallel plate shearing mode fixture. Flexural deformation mode is commonly used for samples such as composites that are very stiff. Flexure modes include 3-point bending, 4-point bending and single and double cantilever modes. FIGS. 9 and 10 of U.S. Pat. No. 5,710,426 show examples of 3-point bending and double cantilever fixtures. In single and double cantilever modes, the ends of the sample are fixed to prevent rotation, causing the sample to develop an s curve when displaced.

In the cantilever flexure modes, the samples are generally parallelepipeds having a rectangular cross section that is usually wider than it is thick, i.e. the thin dimension is oriented parallel to the displacement direction. To obtain accurate measurements of the moduli, the ends of the sample must be rigidly clamped to prevent any rotation; even very small rotations may result in substantial errors in measured moduli. The fixtures of FIG. 9 of U.S. Pat. No. 5,710,426 achieve this for double cantilever mode by using a rigid closed frame that joins the clamping surfaces of the two fixed ends together. While this design is very effective at preventing rotation of the ends of the sample, it has the disadvantage of constraining the sample, preventing its expansion and contraction as it is heated or cooled. This causes thermal stresses and strains to develop in the sample that cause errors in the measured moduli.

One fixture that reduces thermal expansion and contraction strains uses a single cantilever mode in which the sample is clamped at one end and the opposite end is clamped by the moving fixture. This has the disadvantage that the moving fixture is attached to the DMA drive rod and depends on the stiffness of the drive rod and fixture attachment to prevent rotation. However, it often does not adequately prevent rotation of the moving end of the sample, especially when stiff samples are measured. This reduces the accuracy of the measured stiffness and hence the moduli. This method is only suitable for samples having low stiffness, which are less likely to experience rotation of the moving end of the sample.

Another approach for reducing thermal expansion strains is disclosed in U.S. Pat. No. 4,967,601, which is incorporated by reference herein. This patent discloses a resilient sample holder that can move in a direction perpendicular to the displacement of the sample to accommodate the sample thermal expansion and contraction. The fixed ends of the sample fixtures are mounted to flexible arms whose bending characteristics allow the sample fixtures to move. The flexibility of these arms also reduces the resistance to rotation of the fixed ends of the sample fixtures, introducing similar errors to the single cantilever fixtures.

Yet another means for reducing thermal expansion strains is disclosed in U.S. Pat. No. 4,730,498, which is incorporated by reference herein. This patent discloses a double cantilever fixture having the fixed ends mounted on carriages that allow them to move readily in a direction perpendicular to the displacement of the sample to accommodate sample thermal expansion and contraction. However, this fixture is quite massive and requires bearings that must operate with very low friction even at elevated temperatures. The massive fixture may create large temperature lags, which could adversely affect sample measurement accuracy.

SUMMARY

This summary is intended to provide an overview of the subject matter of the present invention, and is not intended to identify essential features or key elements of the subject matter, nor is it intended to be used to determine the scope of the claimed invention. The proper scope of the invention may be ascertained from the detailed description of the embodiments provided below, the figures referenced therein and the claims.

Embodiments of the sample fixture for use in DMAs described herein use the double cantilever displacement mode while avoiding the disadvantages inherent in the references described above. The embodiments disclosed herein provide rigid mountings for the fixed clamps that readily accommodate thermal expansion and contraction of the sample. They avoid the complications of bearings, springs and carriages. They also have a low mass, which keeps the heating and cooling load low and keeps temperature lags small during controlled heating and cooling experiments.

The DMA sample fixtures disclosed herein attach the fixed clamps to a rigid frame using mounts that are compliant in the direction perpendicular to the sample displacement but which at the same time are resistant to rotation about the transverse direction of the sample. The compliant mounts comprise a pair of flexures that are attached to the each fixed clamp and to the clamp frame. In an embodiment, the pair of flexures are thin flat members such that each pair constitutes two parallel leaf springs. The flexures flex to allow the fixed clamps to move perpendicularly to the sample displacement, but at the same time prevent rotation of the fixed clamps.

An embodiment is a dynamic mechanical analyzer (DMA) that has a frame supporting air bearings, and a linear permanent magnet motor. The linear permanent motor has a fixed permanent magnet and a moving coil, and is attached to the frame. It also has a slide attached to the moving coil. Current applied to the coil causes the moving coil to apply a drive force to the slide. The air bearings guide the slide so that it moves only along one direction. A drive rod is attached to one end of the slide. The DMA also has a sample fixture. The sample fixture includes a frame fixture, a moving clamp attached to the other end of the drive rod, a first fixed clamp attached to the frame fixture by a first pair of flexures; and a second fixed clamp attached to the frame fixture by a second pair of flexures. The sample fixture is configured to hold a sample between the first fixed clamp and the second fixed clamp, and the moving clamp is configured to hold the sample at a position between the first fixed clamp and the second fixed clamp.

Another embodiment is a sample fixture that has fixture frame, a first fixed clamp attached to the fixture frame by a first pair of flexures and a second fixed clamp attached to the fixture frame by a second pair of flexures. The first fixed clamp is configured to engage a sample at a first end of the sample and the second fixed clamp is configured to engage the sample at a second end of the sample. The sample fixture also has a moveable clamp configured to engage the sample at a point between the first fixed clamp and the second fixed clamp.

Yet another embodiment is a sample fixture for a dynamic mechanical analyzer that has a first pair of flexures attached at one end to a first fixed clamp and at another end to a first end of a fixture frame. It also has a second pair of flexures attached at one end to a second fixed clamp and at another end to a second end of the fixture frame. It also has a moveable clamp configured to engage a sample at a point between the first fixed clamp and the second fixed clamp. The moveable clamp is configured to be detachably connected to a drive rod of a dynamic mechanical analyzer. The fixture frame is configured to be rigidly mounted in a dynamic mechanical analyzer.

In addition to the specific embodiments described herein, other embodiments and/or modifications will be apparent to one of ordinary skill in the art upon examination of the textual description and the drawings in this specification. It is intended that all such additional embodiments and modifications be included within this specification, be within the scope of the embodiments disclosed herein, and be within the scope of the claims.

BRIEF DESCRIPTION OF THE DRAWINGS

The embodiments described herein can best be understood with reference to the following drawings and textual description. The components identified and/or shown in the figures are not necessarily to scale. The emphasis instead is placed upon illustrating the principles of the embodiments. Moreover, in the figures, like reference numerals designate corresponding parts through the different views.

DETAILED DESCRIPTION

Figure 1:
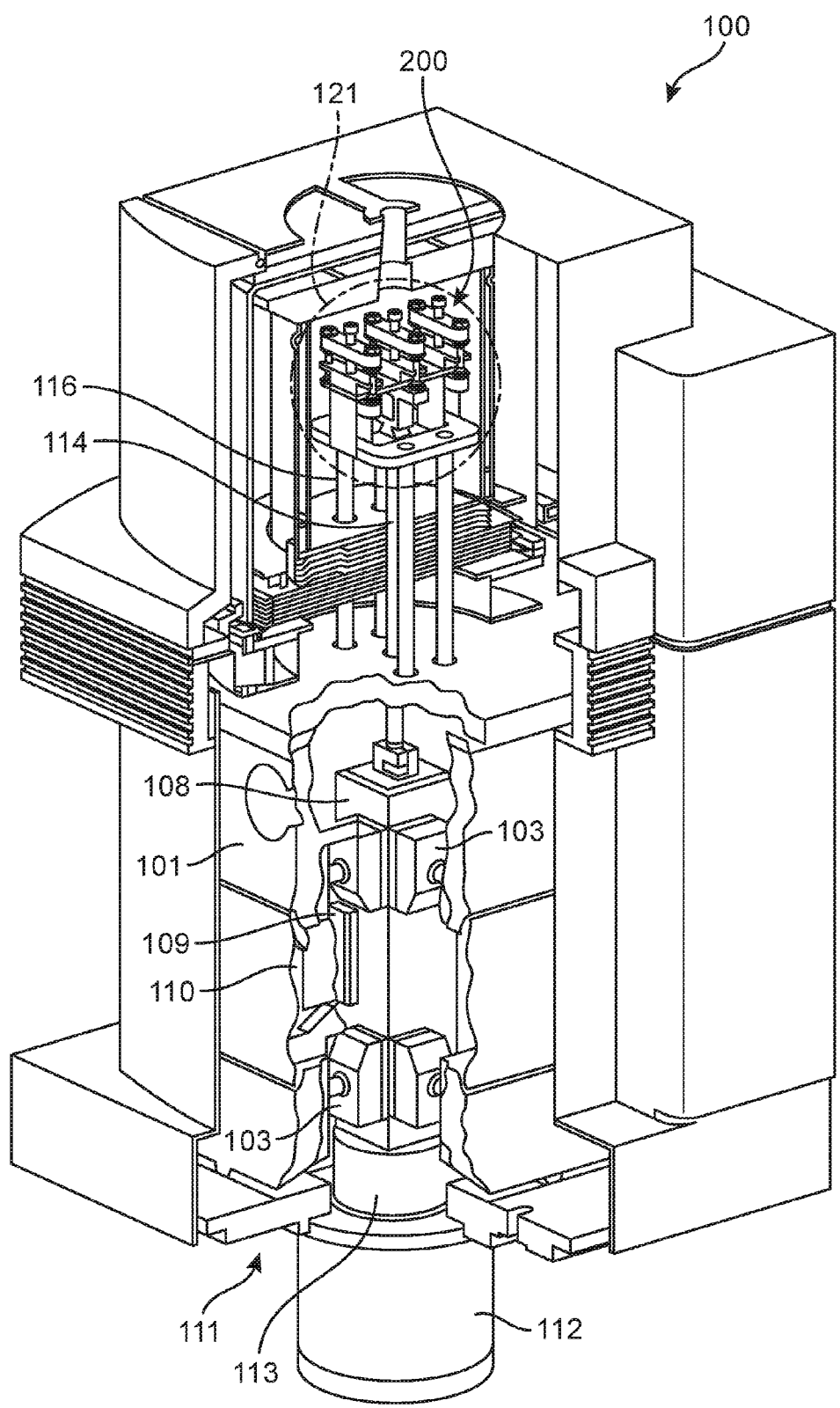
FIG. 1 is a schematic diagram showing a dynamic mechanical analyzer with an embodiment of the sample fixture.

FIG. 1 is an overall schematic diagram of an example of a dynamic mechanical analyzer 100. FIG. 1 shows the frame 101 of the DMA. Frame 101 supports air bearings 103, which surround slide 108 on four sides and constrain slide 108 to move only along the one axis of DMA 100. In the embodiment shown in FIG. 1, that axis is the vertical axis of the DMA. Diffraction grating 109 is mounted on slide 108. Optical transducer 110, which reads optical signals reflected from diffraction grating 109 is mounted on frame 101. Motor assembly 111, which includes permanent magnet assembly 112, is attached to frame 101. Moving coil assembly 113 is attached to the bottom of slide 108. Drive rod 114 connects slide 108 to the moving part of sample fixture 200. Sample fixture 200 is identified by circle 121 in FIG. 1 and is shown more clearly in FIGS. 2 and 3. The nonmoving part of the sample fixture 200 is supported by posts 116.

In operation, DMA 100 is used to characterize the sample mounted in sample fixture 200 by moving drive rod 114 in a predetermined direction, typically in an oscillating motion, although other modes of motion may be used. In the embodiment shown schematically in FIG. 1, the predetermined direction is the vertical direction. In the embodiment of FIG. 1, drive rod 114 is attached to slide 108 at its bottom end and to sample fixture 200 at its top end. The DMA measures the resulting amplitude and phase of the oscillation in the sample mounted in the sample fixture, as a function of the drive force applied to the sample by drive rod 114.

The oscillation of drive rod 114 is measured using diffraction grating 109 which is mounted on slide 108. As slide 108 and diffraction grating 109 move up and down to move sample fixture 200, the intensity of a beam reflected by diffraction grating 109 and incident on optical transducer 110 is modulated. Optical transducer 110 thus produces a series of pulses as slide 108 and diffraction grating 109 move in the predetermined direction. The DMA then calculates the distance the slide has moved by counting the number of pulses received from the optical transducer.

Drive rod 114 is connected to the moving clamp of sample fixture 200, as described below with reference to FIGS. 2 and 3. The force applied to drive rod 114 is measured by measuring the DC current that flows through the windings of moving coil assembly 113, which applies a force to slide 108 and thus to drive rod 114. The applied force is proportional to the DC current, and its direction corresponds to the polarity of the current.

Figure 2:
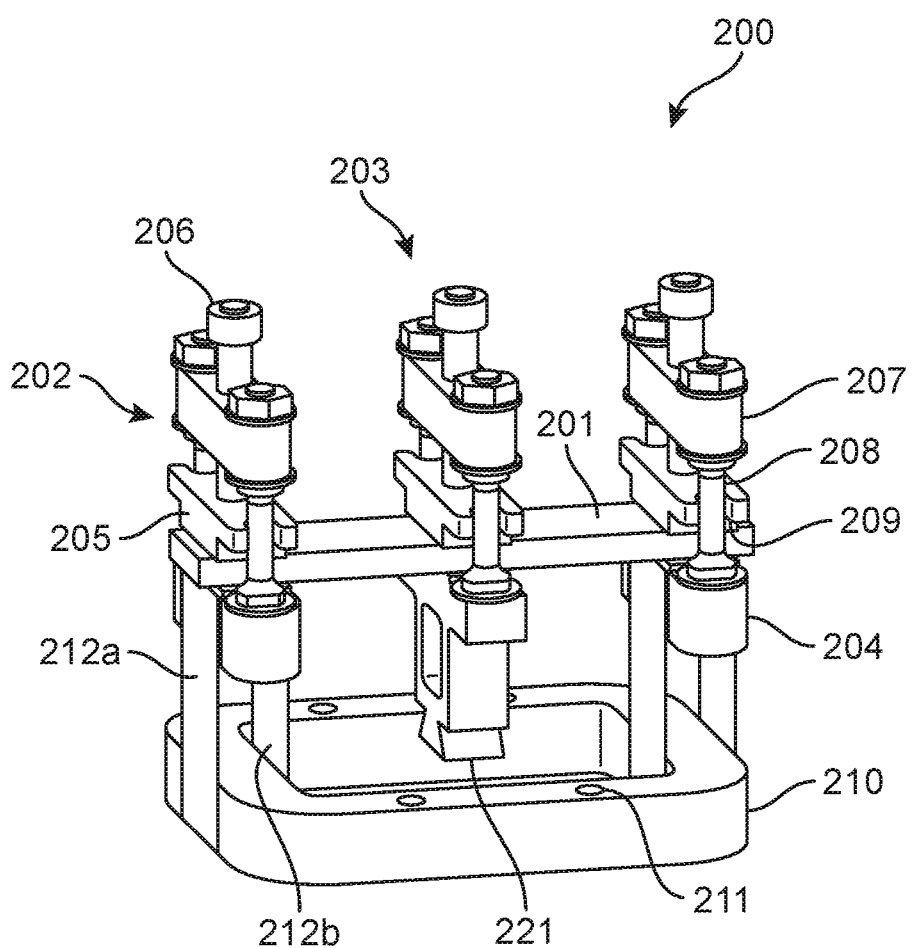
FIG. 2 is an axonometric view of an embodiment of the sample fixture.

FIG. 2 is an axonometric view of a double cantilever dynamic mechanical analysis fixture with laterally compliant fixed sample holders that are restrained against rotation.

As shown in FIG. 2, sample 201 has the form of a parallelepiped. It is held in place by fixed clamps 202. Moving clamp 203 engages the sample at midspan between the fixed clamps and is displaced perpendicularly to the span of the sample to deform the sample. Each fixed clamp comprises a clamp base 204, a movable clamp face 205, a clamping screw 206, a crossbar 207 and rods 208. The rods are affixed to the clamp base and the crossbar is affixed to the ends of the rods opposite the ends that are affixed to the clamp base. The orientation along the length of the sample from one fixed clamp on one side of the sample to the second fixed clamp on the opposite side of the sample will be referred to herein as the "sample orientation."

Clamping screw 206 is threaded through the center of the crossbar and engages the movable clamp face driving it against the sample, clamping it against the clamp base. The ends of the movable clamp faces have notches 209 that engage the rods, preventing the moving clamp faces from rotating. Thus, the ends of the sample are held fast by the movable clamp faces against the clamp bases, preventing the ends from rotating.

Moving clamp 203 comprises a clamp base, a movable clamp face, a clamping screw, a crossbar and rods that can be substantially similar to and perform the same functions as the similar components of the fixed clamps. Dovetail connector 211 is configured to engage a complementary dovetail connector at the top end of a drive rod, such as drive rod 114 shown in FIG. 1. The fixture frame 210 is a rigid structure that can be attached to support posts (not shown) in the DMA using, for example, mounting holes 211 in fixture frame 210. The support posts are in turn connected to the DMA frame and maintain the position of the sample and sample fixtures within a furnace enclosure that controls the experiment temperature and atmosphere.

Each clamp base 204 is joined to fixture frame 210 by a pair of flexures 212a and 212b. In an embodiment, the flexures are flat thin parallelepiped members. In an exemplary embodiment, flexures 212a and 212b are brazed to the outer and inner sides of the end portions of fixture frame 210. Flexures 212a and 212b can be attached in any other appropriate manner to fixture frame 210, for example by welding or diffusion bonding, or by using rivets or bolts. The fixtures could also be machined together with the clamp base out of one block. If the measurements are only carried out at relatively low temperatures, adhesives may be used.

Figure 3:
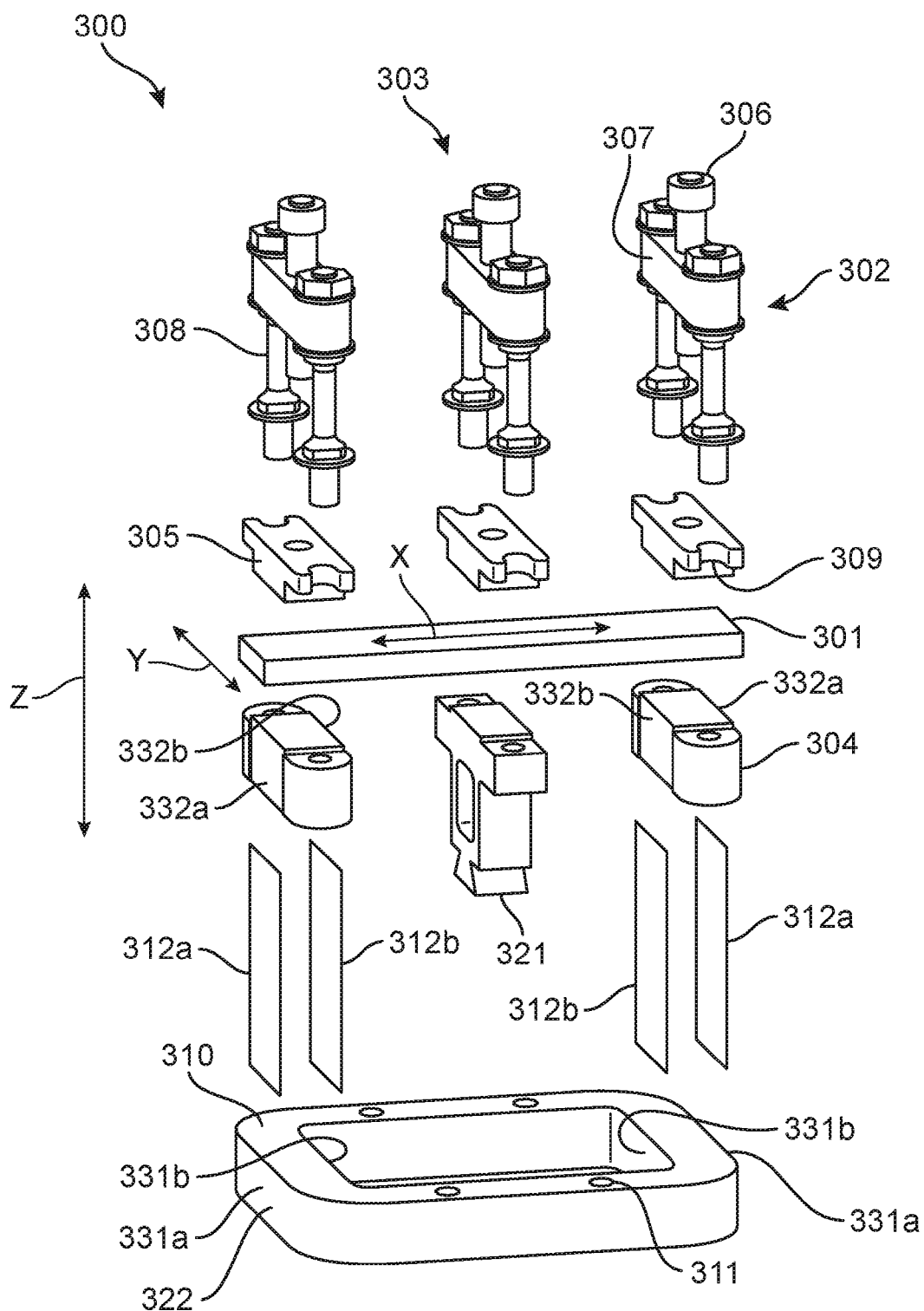
FIG. 3 is an exploded view of the sample fixture shown in FIG. 2.

As shown in FIGS. 2 and 3, flexures 212a and 212b have a thin dimension, a length and a width. The thin dimension of the flexures is oriented parallel to the sample orientation, i.e., parallel to the span of the sample. The long dimension of the flexures is oriented parallel to the direction of the sample displacement and the width of the flexures is oriented perpendicular to the direction of the sample displacement and perpendicular to the sample orientation. Thus the long direction of the flexures is parallel to the direction along which the sample would be displaced. Each of the two flat thin flexures is attached by brazing or by another technique at one end to opposite faces of the clamp base that are perpendicular to the clamping surface and at the opposite ends to corresponding inner and outer faces on the frame, as illustrated in FIGS. 2 and 3.

Figure 4:
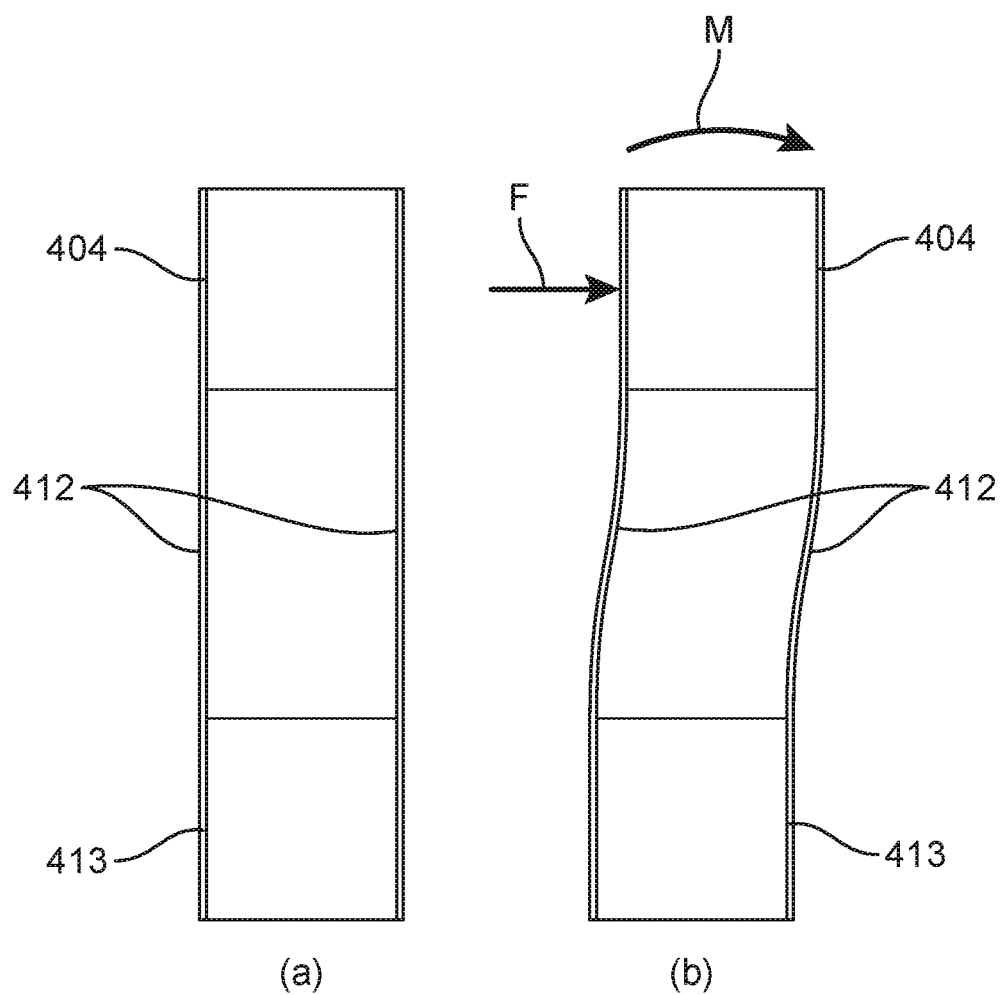
FIG. 4(a) shows the flexure used in the embodiment of FIG. 2 in its undisplaced position.
FIG. 4(b) shows the flexure used in the embodiment of FIG. 2 in a displaced position.

As best shown in the exploded view of the sample fixture in FIG. 3, the flexures are attached to the clamp base faces 332a and 332b and to the fixture frame faces 331a and 331b continuously over the entire overlapping surfaces by a process such as brazing to ensure that the joints are rigid. This construction completely prevents rotation of the flexures relative to the clamp bases and the frame. Thus, when the clamp bases are displaced parallel to the sample span and perpendicular to the sample displacement, whether by sample thermal expansion or by sample contraction, the flexures will flex in an S-bend, as shown in FIG. 4(b) (described below). The clamping faces of the clamp base will remain parallel to each other and perpendicular to the sample orientation. This construction prevents rotation of the ends of the sample.

The exploded view of sample fixture 300 in FIG. 3 shows the components of the sample fixture more clearly. It shows how sample 301 may be held in place at both its ends by fixed clamps 302. FIG. 3 shows that each of fixed clamps 302 has a clamp base 304, a moveable clamp face 305, a clamping screw 306, a crossbar 307 and rods 308. Notches 309 at the end of the movable clamp faces 305 engage rods 308 so as to prevent the moving clamp faces 305 from rotating. Fixture frame 310 can be mounted in the DMA by attaching it, for example, to the DMA's support posts (such as posts 116 shown in FIG. 1) via mounting holes 311.

FIG. 3 also includes arrows labeled X, Y and Z which illustrate the directions referred to in this specification. Thus the Z-direction is the direction parallel to the sample displacement—when the sample fixture is installed in a DMA as shown in FIG. 1, the Z direction would be parallel to the direction of drive rod 114. The X-direction is parallel to the length of the sample, and the Y-direction, which is perpendicular to the Z-direction and to the X-direction, is parallel to the width of the sample.

Also, the term "direction" as used herein, is bi-directional, as indicated by the double arrows in FIG. 3. For example, if the Z-direction is vertical, movement in the Z-direction means movement both up and down. If the X-direction is horizontal from the left to the right, movement in the X-direction means movement both to the left and to the right. Movement in the Y-direction also means movement in both directions—in the illustration of FIG. 3, it would include movement towards the viewer of the illustration and movement away from the viewer.

Movable clamp 303 may engage the sample at midspan between fixed clamps 302. Movable clamp 303 has a clamp base, a movable clamp face, a clamping screw, a crossbar and rods. These components can be similar to and perform the same functions as the corresponding components of fixed clamps 302. When the sample fixture shown in FIGS. 2 and 3 is installed in a DMA such as the DMA shown in FIG. 1, dovetail connector 321 engages a complementary dovetail connection at the top of a drive rod such as drive rod 114, shown in FIG. 1.

FIG. 3 most clearly shows the pair of flat flexures 312a and 312b. The top ends of flexures 312a are brazed to outer sides 332a of clamp base 304 and the tops ends of flexures 312b are brazed to the inner sides 332b of clamp base 304. The bottom ends of flexures 312a and 312b are brazed to fixture frame 310, on either side of end portions 322 of fixture frame 310. Specifically, flexures 312a are brazed to the outer sides 331a of end portions 322 and flexures 312b are brazed to the inner sides 331b of end portions 322.

FIG. 4(a) shows a flexure in its undisplaced position and FIG. 4(b) shows that flexure in a displaced position. Joining ends 404 and 413 of the flexures at the frame end and at the clamp base end forces them to bend in an S-curve when the clamp base is displaced laterally and prevents the clamp base from rotating.

The flexures are forced to bend in an S-curve because end 413 is brazed to frame end 322 of fixture frame 310 (shown in FIG. 3), and end 404 is brazed to clamp base 304 (shown in FIG. 3). Frame end 322 is fixed because it is part of the fixture frame that is configured to be attached to the DMA. When force F is applied to clamp base 304 by expansion or contraction of the sample, clamp base 304 moves laterally and without rotation. When the sample is displaced by the moving clamp 303, the ends of the sample in the fixed clamps 302 are prevented from moving in the direction of the moving clamp displacement by the fixed clamps. The fixed clamps are configured to also prevent the ends of the sample from rotating when the sample expands or contracts.

A moment M that depends on the force exerted by the moving clamp and the sample stiffness is also developed at the fixed clamps. That moment tends to rotate the fixed clamps, but is resisted by flexures 212a and 212b. Thus one of the flexures is loaded in tension and the other is loaded equally but in compression. The tension and compression forces acting together over the distance they are separated constitute a couple that resists the moment developed in the sample at its clamped end by the sample displacement and by any expansion or contraction of the sample.

Although the flexures are relatively thin, they still have substantial cross sectional areas and are fairly short. For this reason, the flexures can withstand tension and compression loads with very little displacement, and thereby resist the moment with very little rotation. The flexures may be fabricated, for example, from materials that are oxidation resistant, and can withstand the temperatures they will be subjected to in the DMA without warping or losing their stiffness. For example, the flexures may be fabricated from stainless steel and may be 0.005 to 0.015 inches thick, for example 0.008 inches thick. Their width would typically be on the order of the maximum width of the samples, and their length would generally be selected to fit into the fixture frame.

On the other hand, the flexures have low lateral stiffness, because they are very thin in the X-direction, which is the direction of the displacement of the fixed clamp. The cross sectional area of the flexures, their length and the modulus of elasticity of the material of construction determines the stiffness of the flexures. The flexures should be fabricated from materials that can operate within their elastic range at maximum lateral displacement. Otherwise the flexures may yield and become permanently deformed. Given that the moment developed in restraining the ends of the sample against rotation puts one of the pair of thin flexures in compression, the combination of length and radius of gyration of the flexures must be chosen to ensure that they do not buckle under the compression load.

The flexures may be fabricated from stainless steel parallelepipeds or from other materials that have substantially similar mechanical properties, i.e., have substantially similar stiffness, and can operate within their elastic range at the maximum lateral displacement and at the maximum and minimum temperatures anticipated during operation of the DMA.

Although only one embodiment of the sample fixture has been described in detail in this specification, other embodiments, structures and features will be apparent to one of ordinary skill in the art upon examination and study of the detailed description and the accompanying figures. It is intended that all such additional embodiments, structures and features be included within this disclosure, be within the scope of the embodiment described herein, and be protected by the claims set forth below.

What is claimed is:

1. A dynamic mechanical analyzer comprising:
    a frame supporting air bearings;
    a linear permanent magnet motor comprising a fixed permanent magnet and a moving coil, wherein the fixed permanent magnet is attached to the frame;
    a slide having a first end and a second end, wherein the moving coil is attached to the second end of the slide, wherein current applied to the coil causes the moving coil to apply a drive force to the slide and wherein the air bearings guide the slide so that it moves only along a predetermined direction;
    a drive rod having a first end attached to the first end of the slide and a second end; and
    a sample fixture comprising:
        a frame fixture attached to the frame;
        a moving clamp attached to the second end of the drive rod,
        a first fixed clamp attached to the frame fixture by a first pair of flexures; and
        a second fixed clamp attached to the frame fixture by a second pair of flexures,
    wherein the sample fixture is configured to hold a sample between the first fixed clamp and the second fixed clamp,
    wherein the moving clamp is configured to hold the sample at a position between the first fixed clamp and the second fixed clamp; and
    wherein each pair of flexures comprises two parallel leaf springs.

2. The dynamic mechanical analyzer of claim 1, further comprising a diffraction grating mounted on the slide, and an optical transducer configured to produce a series of pulses indicative of a relative position of the slide as the slide and the diffraction grating move in the predetermined direction.

3. The dynamic mechanical analyzer of claim 1, wherein the frame fixture is attached to the frame by a plurality of posts oriented parallel to the predetermined direction.

4. The dynamic mechanical analyzer of claim 1, wherein the flexures are flat thin parallelepipeds.

5. The dynamic mechanical analyzer of claim 4, wherein the flexures have a thin dimension, a length and a width, and wherein the thin dimension of the flexures is oriented parallel to a span from the first fixed clamp to the second fixed clamp.

6. The dynamic mechanical analyzer of claim 4, wherein the length of the flexures is oriented parallel to the drive rod.

7. The dynamic mechanical analyzer of claim 4, wherein the width of the flexures is oriented perpendicular to the drive rod.

8. The dynamic mechanical analyzer of claim 1, wherein the sample fixture further comprises a clamping screw configured to drive a movable clamp face against the sample.

9. The dynamic mechanical analyzer of claim 1, wherein the flexures are attached to the frame fixture by brazing the flexures to faces of the frame fixture.

10. The dynamic mechanical analyzer of claim 1, wherein the sample fixture is configured such that, when the first fixed clamp and the second fixed clamp are displaced in a direction that is perpendicular to the predetermined direction, the flexures flex in an S-bend.

11. A sample fixture comprising:
    a fixture frame;
    a first fixed clamp attached to the fixture frame by a first pair of flexures, wherein the first fixed clamp is configured to engage a sample at a first end of the sample;

a second fixed clamp attached to the fixture frame by a second pair of flexures, wherein the second fixed clamp is configured to engage the sample at a second end of the sample; and a moveable clamp configured to engage the sample at a point between the first fixed clamp and the second fixed clamp, wherein the flexures have low lateral stiffness.

12. The sample fixture of claim 11, wherein the first pair of flexures comprises two thin parallelepipeds and the second pair of flexures comprises two thin parallelepipeds.

13. The sample fixture of claim 12, wherein the flexures are configured to flex in an S-bend if one or both of the first fixed clamp and the second fixed clamp is displaced laterally.

14. The sample fixture of claim 12, wherein the first pair of flexures is attached to a first end of the fixture frame by brazing and the second pair of flexures is attached to a second end of the fixture frame by brazing.

15. The sample fixture of claim 11, wherein the flexures are stainless steel parallelepipeds that are between about 0.005 and about 0.015 inches thick.

16. The sample fixture of claim 11, wherein the flexures are fabricated from materials that exhibit mechanical properties that are substantially similar to the mechanical properties of stainless steel parallelepipeds that are between 0.005 and 0.015 inches thick.

17. The sample fixture of claim 11, wherein the flexures resist rotation about an axis perpendicular to their length.

18. A sample fixture for a dynamic mechanical analyzer comprising:

a first pair of flexures attached at a first end of the first pair of flexures to a first fixed clamp and at a second end of the first pair of flexures to a first end of a fixture frame;

a second pair of flexures attached at a first end of the second pair of flexures to a second fixed clamp and at a second end of the second pair of flexures to a second end of the fixture frame; and a moveable clamp configured to engage a sample at a point between the first fixed clamp and the second fixed clamp, wherein the moveable clamp is configured to be detachably connected to a drive rod of a dynamic mechanical analyzer, wherein the fixture frame is configured to be rigidly mounted in the dynamic mechanical analyzer; and wherein the flexures are fabricated from materials that exhibit substantially similar mechanical properties as stainless steel parallelepipeds that are between 0.005 and 0.015 inches thick.

19. The sample fixture for a dynamic mechanical analyzer of claim 18, wherein the flexures are configured to flex in an S-bend if the first fixed clamp and the second fixed clamp are displaced laterally.

20. The sample fixture for a dynamic mechanical analyzer of claim 18, wherein the flexures are stainless steel parallelepipeds that are between about 0.005 and about 0.015 inches thick.

21. The sample fixture for a dynamic mechanical analyzer of claim 18, wherein each pair of flexures comprises two parallel leaf springs.

22. The sample fixture for a dynamic mechanical analyzer of claim 18, wherein the flexures are configured to prevent rotation of the fixed clamps.

* * * * *